(12) United States Patent
Winkler (10) Patent No.: US 8,764,294 B2
(45) Date of Patent: Jul. 1, 2014

(54) CIRCUMFERENTIAL GUIDE FOR ROLLING BODIES, AND LINEAR GUIDE UNIT EQUIPPED THEREWITH

(75) Inventor: Thomas Winkler, Sulzbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 484 days.

(21) Appl. No.: 12/935,053

(22) PCT Filed: Mar. 27, 2009

(86) PCT No.: PCT/EP2009/002257
§ 371 (c)(1),
(2), (4) Date: Jan. 27, 2011

(87) PCT Pub. No.: WO2009/121526
PCT Pub. Date: Oct. 8, 2009

(65) Prior Publication Data
US 2011/0200277 A1   Aug. 18, 2011

(30) Foreign Application Priority Data
Mar. 29, 2008 (DE) .......................... 10 2008 016 356

(51) Int. Cl.
*F16C 29/06* (2006.01)
*F16C 29/04* (2006.01)

(52) U.S. Cl.
USPC ............................................. 384/43; 384/49

(58) Field of Classification Search
USPC ........................................ 384/43–45, 49, 451
See application file for complete search history.

(56) References Cited

U.S. PATENT DOCUMENTS

| 5,431,498 | A | * | 7/1995 | Lyon ................................ | 384/45 |
| 5,487,609 | A | * | 1/1996 | Asada .............................. | 384/18 |
| 5,769,543 | A | * | 6/1998 | Tsukada et al. ................. | 384/15 |
| 6,619,844 | B1 | * | 9/2003 | Baalmann et al. .............. | 384/43 |
| 7,950,853 | B2 | * | 5/2011 | Mueller .......................... | 384/44 |
| 2001/0014278 | A1 | | 8/2001 | Maffeis | |
| 2007/0025650 | A1 | * | 2/2007 | Hsin-Liang et al. ............ | 384/45 |
| 2008/0138001 | A1 | * | 6/2008 | Winkler .......................... | 384/15 |

FOREIGN PATENT DOCUMENTS

| DE | 33 13 129 | 10/1984 |
| DE | 88 11 178 | 12/1988 |
| DE | 695 05 961 | 5/1999 |
| DE | 199 37 278 | 2/2001 |
| DE | 20 2006 005 762 | 8/2007 |
| EP | 0 577 963 | 1/1994 |
| GB | 2 103 731 A | 2/1983 |
| WO | 99/25983 | 5/1999 |

* cited by examiner

*Primary Examiner* — Thomas R Hannon
*Assistant Examiner* — Adam D Rogers
(74) *Attorney, Agent, or Firm* — Simpson & Simpson, PLLC (57) ABSTRACT

A circumferential guide for rolling bodies for use in a linear guide unit which has a carriage-type part and a rail-type part that has at least one loaded roller body row and one unloaded roller body row during the intended operation. The circumferential guide is configured as a pre-mountable unit. A linear guide unit is also disclosed that contains at least one circumferential guide. The circumferential guide has at least one component for the rolling bodies, which at least partially guides both the loaded rolling body rows and the unloaded rolling body rows (Ru) during the intended operation. This configuration achieves that the parts requirement for the circumferential guide can be held low, resulting both in a reduction of production costs and in a compact and stable shape of the same.

14 Claims, 12 Drawing Sheets

CIRCUMFERENTIAL GUIDE FOR ROLLING BODIES, AND LINEAR GUIDE UNIT EQUIPPED THEREWITH

This application is a 371 of PCT/EP2009/002257 filed Mar. 27, 2009, which in turn claims the priority of DE 10 2008 016 356.2 filed Mar. 29, 2008, the priority of both applications is hereby claimed and both applications are incorporated by reference herein.

FIELD OF THE INVENTION

The invention relates to a recirculating element guide for rolling elements for use in a linear guide unit consisting of a carriage-type part and a rail-type part, having at least one loaded rolling element row and one unloaded rolling element row during operation as intended, the recirculating element guide being designed as a unit that can be preassembled. The invention furthermore relates to a linear guide unit.

BACKGROUND OF THE INVENTION

As is known, recirculating element guides for rolling elements are used where linear guides that can take high loads and are likewise highly precise are to be implemented. This may be the case with machine tools, for example.

In general, recirculating element guides have rolling element rows situated opposite one another in pairs, one loaded rolling element row between suitable rolling element raceways in each case taking the bearing load between a fixed rail-type component and a carriage-type component that can be moved relative to the latter, and the other, unloaded rolling element row in each case assuming the function of a return for the rolling elements into the loaded rolling element row. Provided at the end of the rolling element rows there are in each case suitable redirection means, which enable the rolling elements to be transferred from one rolling element row to the other.

DE 33 13 129 has disclosed a recirculating element guide of the type in question for reducing the complexity of production and simplifying assembly and disassembly of a linear guide unit. Here, the recirculating element guide is configured in such a way that the loaded and the unloaded rolling element rows are each implemented by means of separate components, which have to be held together by means of a retaining element in the form of a wire.

DE 20 2006 005 762 U1 has disclosed a recirculating element guide in which, in order to achieve an overall height which is as small as possible, redirection guides for redirecting the rolling elements into the loaded and unloaded rolling element rows, respectively, are configured in such a way that the redirection planes (i.e. the planes formed in each case between the centers of the loaded and the centers of the unloaded rolling element rows) are at an angle of less than 90° to the plane formed between the centers of the loaded rolling element rows.

Finally, DE 695 05 961 T2 has disclosed a linear guide unit in which a carriage-type component is guided in a low-friction manner on a rail-type component by means of a recirculating element guide. Here, the carriage-type component is designed as a double-T-beam shape with two downward-projecting legs which fit part way around the rail-type component. In this arrangement, the loaded rolling element rows are each arranged between the rail-type component and the legs of the carriage-type component. The unloaded rolling element rows, by contrast, are arranged in channels machined into the legs of the carriage-type component.

OBJECT OF THE INVENTION

It is the underlying object of the invention to provide a recirculating element guide which is compact and stable, forms an independent unit that can be preassembled, and requires a comparatively small number of components.

It is furthermore the underlying object of the invention to present a linear guide unit which is easy to assemble and disassemble and has a high bearing capacity.

SUMMARY OF THE INVENTION

The invention is based on the realization that skillful design of a recirculating element guide makes it possible to exert a positive effect on the compactness and stability thereof and the number of components required thereby, and that the use of such a recirculating element guide in a linear guide unit can have a positive effect on the bearing capacity characteristics thereof and contributes to greater ease of assembly of the linear guide unit.

The invention therefore takes as its starting point a recirculating element guide for rolling elements for use in a linear guide unit consisting of a carriage-type part and a rail-type part, having at least one loaded rolling element row and one unloaded rolling element row during operation as intended, the recirculating element guide being designed as a unit that can be preassembled. Moreover, provision is made by the invention for the recirculating element guide to contain at least one component for the rolling elements which at least partially guides both the rolling element rows which are loaded during operation as intended and the unloaded rolling element rows.

This construction makes it possible to keep down the number of components required for the recirculating element guide, leading to a reduction in production costs. In addition, this measure allows a compact and stable form thereof.

The subclaims describe preferred developments or embodiments of the invention.

According to a first development of the inventive concept, provision is made for the component mentioned to be part of a rolling element bearing cage or substantially to form the latter. A dual function of the component is thereby achieved, and this naturally leads to a further reduction in components that are necessary per se.

According to a second embodiment of the invention, the component has groove-shaped or tubular parts, this being advantageous particularly if spherical rolling elements are used.

According to a further embodiment of the inventive concept, provision is made for two loaded rolling element rows and two unloaded rolling element rows to be provided, a first plane being formed by the centers of the two loaded rolling element rows, and a further plane in each case being formed by the centers of each loaded rolling element row and the unloaded rolling element row respectively associated therewith, the first plane in each case enclosing a particular angle with the further planes. This construction ensures that the recirculating element guide requires only a small amount of space when installed or overall height of the recirculating element guide.

It is advantageous if the angles formed in each case between the first plane and the further planes are approximately equal. On the one hand, this facilitates production of the recirculating element guide and, on the other hand, leads to a more uniform flow of force during operation. If, as is highly expedient, provision is made for the angles to be less than 90°, preferably between 5° and 45°, this allows particularly space-saving installation of the recirculating element guide.

Filling the recirculating element guide with rolling elements is easier if, as is advantageous, at least one cover-type component is provided for redirecting the rolling elements into the various rolling element tracks. To fill the recirculating element guide with rolling elements, the cover-type component has merely to be removed to enable the recirculating element guide or rolling element cage to be filled with rolling elements.

In a further expedient development of the inventive concept, provision is made for an elongate plate-shaped component to be secured on the abovementioned component, which plate-shaped component contains at least one rolling element raceway. In addition, the plate-shaped component can have a curved or angled form in cross section and have at least two contact surfaces, which are suitable for being brought into effective contact with contact surfaces on the carriage-type part of a linear guide unit. By virtue of these design measures, the plate-shaped component can contribute to stabilizing the redirection guide and also serve to absorb bearing forces. Furthermore, it is particularly advantageous here if the contact surfaces of the plate-shaped component and the contact surfaces of the carriage-type part are in each case approximately at right angles to one another, this leading to good absorption of bearing forces, even when they occur in different directions.

Moreover, provision is expediently made for the abovementioned component to have sealing means for contact with the rail-type part of a linear guide unit, leading to enhanced protection for the recirculating element guide from contamination and, where applicable, from loss of lubricant and hence contributing to an increase in the service life of the device.

The rolling elements are preferably of spherical design, allowing an even more compact construction and also easier production compared with other shapes of rolling element.

A linear guide unit with a carriage-type part and a rail-type part should contain at least one recirculating element guide according to the invention in order to obtain advantages in terms of assembly. This linear guide unit should particularly advantageously contain at least two recirculating element guides according to the invention in order to make the best possible use of the advantages of the recirculating element guide according to the invention. Thus at least one recirculating element guide according to the invention should be arranged on each side of the rail-type component. It is also possible to provide more than two recirculating element guides according to the invention, namely when the intention is to implement a correspondingly long linear guide unit.

Provision can advantageously be made for the recirculating element guides to be arranged in such a way that an X-arrangement of the lines of pressure of the loaded rolling element rows is obtained. This makes it possible for the recirculating element guide to take up only a small amount of installation space in the carriage-type part and for the latter to be made particularly rigid.

It is furthermore expedient if both the rail-type part and the carriage-type part have recesses, into which the component for accommodating the rolling elements at least partially projects.

In an alternative, advantageous embodiment of the invention, provision can also be made for the carriage-type part to have rolling element raceways. Here, the shape of the component or rolling element cage can expediently be matched immediately to the contour which is formed between the rail-shaped and the carriage-shaped part in order to facilitate precise alignment of the component or rolling element cage.

In order to allow preloading of the linear guide unit, means for setting a preload should expediently be provided. These setting means can very advantageously be designed as shaft-shaped components which can be pressed into groove-shaped recesses in the carriage-type component. For example, the preload of a linear guide unit can be set very conveniently if the carriage-type part has a plurality of approximately perpendicularly projecting legs which fit at least part way around the rail-type part, the recirculating element guides being arranged between the carriage-type part and the rail-type part, and the groove-shaped recesses being machined into the legs and having a tapering aperture cross section such that, when the shaft-shaped components are pressed into the groove-shaped recesses, one part of the legs in each case undergoes a deflection which increases the preload.

As an alternative, however, it is also possible to achieve convenient setting of a preload in a very advantageous manner if the means for setting the preload are designed as countersunk screws, the carriage-type part having a plurality of approximately perpendicularly projecting legs which fit at least part way around the rail-type part, the recirculating element guides being arranged between the carriage-type part and the rail-type part, and longitudinal slots being machined into the legs, in the region of which countersunk holes are machined, such that, when the countersunk screws are screwed into the countersunk holes, one part of the legs in each case undergoes a deflection which increases the preload.

BRIEF DESCRIPTION OF THE DRAWINGS

The invention is explained in greater detail below by means of illustrative embodiments with reference to the attached drawing. In the drawing.

DETAILED DESCRIPTION OF THE DRAWINGS

Figure 1:
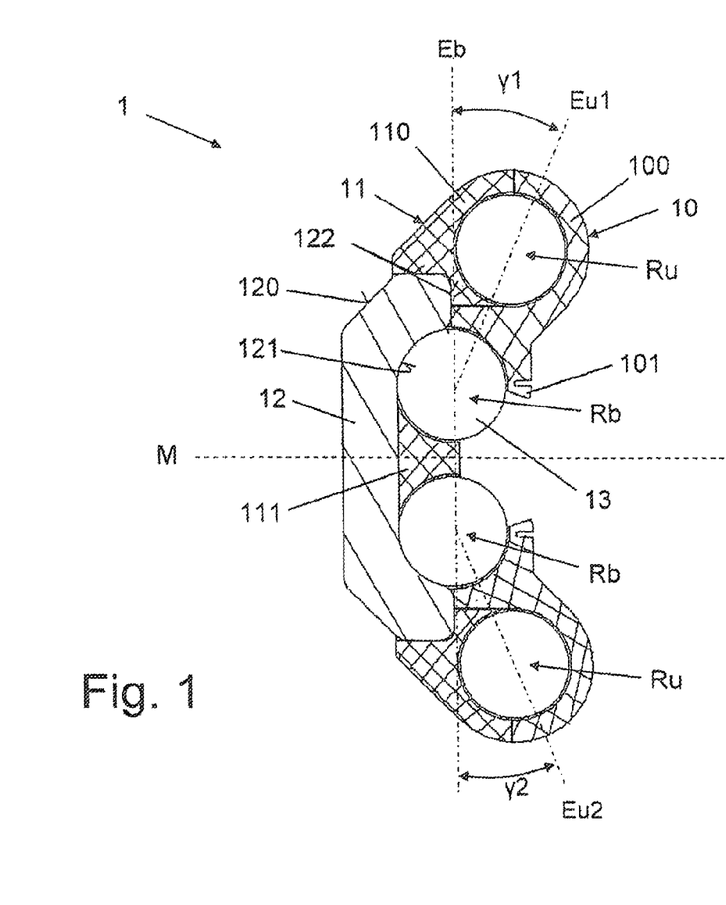
FIG. 1 shows a first illustrative embodiment of a recirculating element guide according to the invention in a sectional representation.

Reference will be made first of all to FIG. 1, in which a recirculating element guide 1 according to the invention is represented. The recirculating element guide 1 is constructed symmetrically with respect to an imaginary center line M and has a rolling element cage consisting of a plurality of parts 10, 11. Part 10 of the rolling element cage has a guide groove 100, in which spherical rolling elements 13 are guided. Part 11 of the rolling element cage likewise has a guide groove 110, which serves to guide the rolling elements 13. The two guide grooves 100 and 110 complement each other to form a tubular guide channel.

It is furthermore apparent that part 11 has a central part 111 approximately in the region of the center line M, and a guide channel for the rolling elements 13 is likewise formed between the central part 111 and part 10. For this purpose, part 10 and the central part 111 have correspondingly shaped concave surfaces (not specified in detail) in these regions.

With respect to an impinging load, the rolling elements 13 guided in parts 10 and 11 of the rolling element cage form unloaded rolling element rows Ru and loaded rolling element rows Rb, with an unloaded rolling element row Ru being associated with each loaded rolling element row Rb. The rolling elements 13 of the unloaded rolling element rows Ru are fed back to the loaded rolling element row Rb and vice versa. As is furthermore apparent, a plane Eb is formed by the centers of the loaded rolling element rows Rb, and two planes Eu1 and Eu2, respectively, are formed by the centers of the loaded rolling element rows Rb and the centers of the unloaded rolling element rows Ru respectively associated therewith, these planes Eb and Eu1, Eu2 in each case enclosing a preferred angle $\gamma 1$ and $\gamma 2$, respectively, with one another. Owing to the already mentioned symmetry of the recirculating element guide 1, the angles $\gamma 1$ and $\gamma 2$ formed are, of course, equal but can also differ if there is no symmetry.

It is furthermore apparent in FIG. 1 that there is a support plate 12, which is bent or angled approximately in a C-shape in cross section and has contact surfaces 120 aligned approximately at right angles to one another. The support plate 12 is furthermore provided with concave bearing running surfaces 121 for the rolling elements 13 and, at its ends, which are angled when viewed in cross section, has mounting surfaces 122 approximately at right angles to one another, which engage in corresponding recesses in the rolling element cage (part 110).

To ensure that the recirculating element guide 1 is leak-tight, sealing lips 101 are provided or formed on part 10 of the rolling element cage. The support plate 12 is preferably produced from a high-strength material, such as steel, while parts 10 and 11 of the rolling element cage are preferably manufactured from plastic. Finally, it may be mentioned that the recirculating element guide 1 could also be embodied with a split along the center line M, but this is not shown specifically. Such a recirculating element guide would then contain only one loaded and one unloaded rolling element row.

Figure 2:
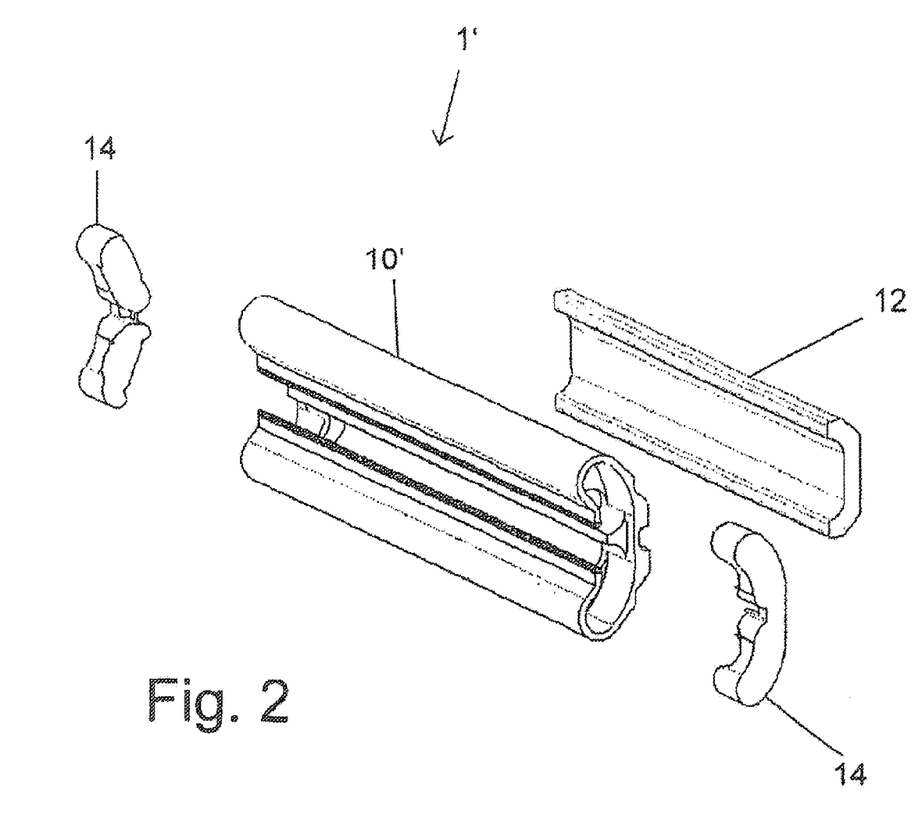
FIG. 2 shows a second illustrative embodiment of a recirculating element guide according to the invention in an exploded perspective representation without rolling elements.

FIG. 2 shows an alternative recirculating element guide 1' to that in FIG. 1, consisting of a rolling element cage 10', which has two removable cage covers 14. The cage covers 14 are pushed into the rolling element cage 10' at the ends and have appropriate redirection tracks (not shown specifically) for the rolling elements 13 to ensure redirection between the rolling element rows Ru, Rb (cage covers of this kind are of course also used in recirculating element guide 1 but have not been shown). Moreover, a support plate 12 of the type already described in detail in FIG. 1 is once again provided. In contrast to recirculating element guide 1, the rolling element cage 10' of recirculating element guide 1' is of one-piece design and has tubular parts, in which the rolling element rows Ru, Rb are guided. No rolling elements are shown in FIG. 2.

Figure 3:
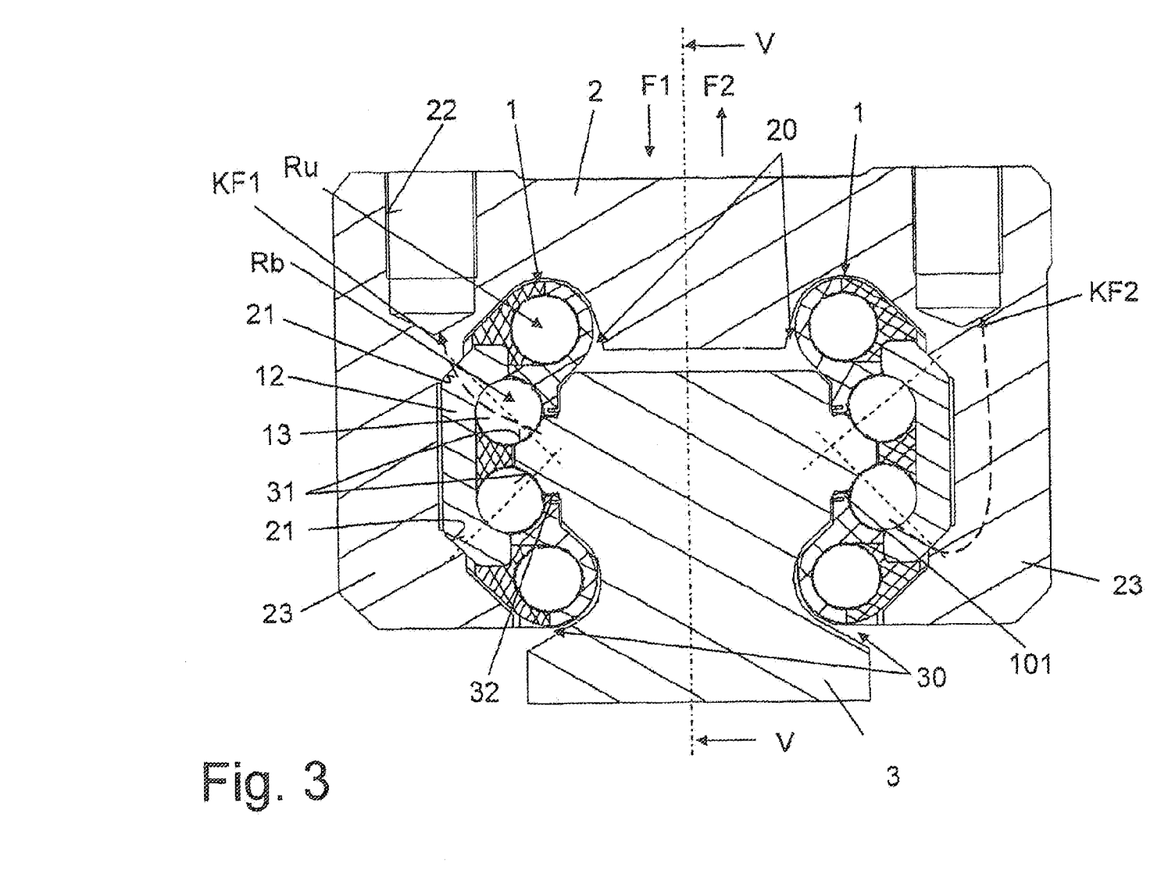
FIG. 3 shows a linear guide unit with recirculating element guides according to the invention installed, in a cross-sectional view.

A linear guide unit with mounted redirection guides 1 according to the invention is now shown in FIG. 3. The linear guide unit consists of a guide carriage 2, which is held in a longitudinally movable manner on a guide rail 3. The shape of the guide carriage 2 is approximately that of an inverted U with two downward-projecting legs 23 which overlap or fit around the guide rail 3 on both sides. The recirculating element guides 1 according to the invention are in each case arranged between the guide carriage 2 and the guide rail 3.

Here, the guide carriage 2 has recesses 20 and the guide rail 3 recesses 30 for the rolling element cage of the recirculating element guides 1. It is evident that the rolling element cage projects into the recesses 20 and 30 while maintaining a clearance but has no contact there with the guide carriage 2 and the guide rail 1.

The guide rail 3 furthermore has bearing running surfaces 31 for the rolling elements 13 and sealing surfaces 32 for contact with the sealing lips 101. The legs 23 of the guide carriage 2 are provided with contact surfaces 21 which are approximately at right angles to one another and interact with the contact surfaces 120 (described in FIG. 1) of the support plate 12. The orientation of the contact surfaces 120 and 21 approximately at right angles allows good absorption of compressive forces F1 and tensile forces F2 acting on the guide carriage 2. The approximate lines of force KF2 and KF1 acting in the case of a tensile and a compressive force respectively are indicated by dashed arrows. It will therefore be appreciated that the absence of contact between the rolling element cages and the recesses 20 and 30 already mentioned means that the bearing loads F1 and F2 are transmitted exclusively via the support plate 12 of the redirection guides 1. It is apparent from the pressure lines indicated by dashes that the recirculating element guides 1 are mounted in such a way that an X-arrangement of the pressure lines is obtained. Finally, it is also worth mentioning blind holes 22, by means of which components to be subjected to translatory movement can be mounted to the guide carriages 2.

The use of the support plate 12 furthermore offers the advantage that there is no need to provide any expensive-to-machine bearing running surfaces in the guide carriage 2, more specifically in the legs 23 thereof. When the bearing running surfaces 121 are damaged, for example, simple replacement of the recirculating element guide 1, which is embodied as a preassembled unit, is sufficient.

Figure 4:
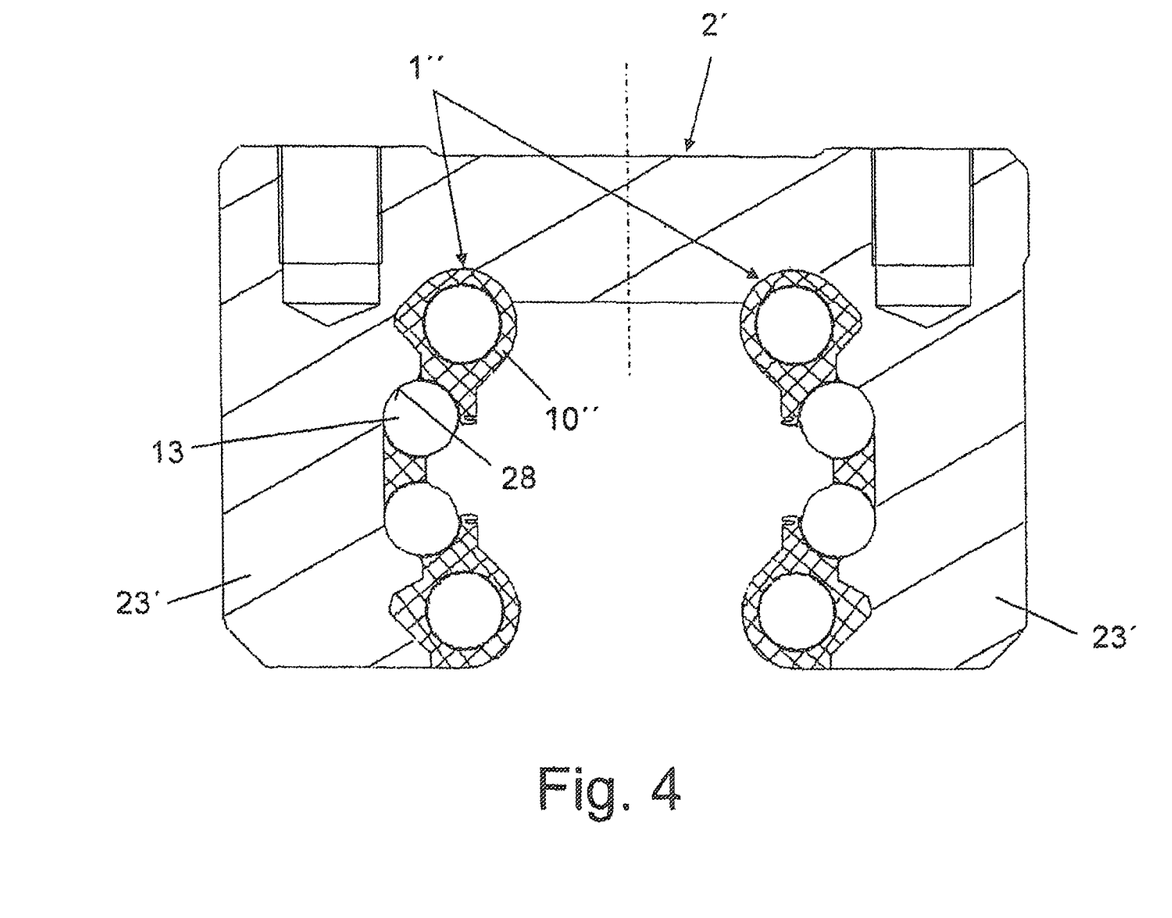
FIG. 4 shows a third illustrative embodiment of a recirculating element guide according to the invention mounted in a carriage-type part, in a cross-sectional view.

FIG. 4 shows a guide carriage 2' embodied in an alternative way, in which recirculating element guides 1", likewise embodied in an alternative way, are used. The recirculating element guides 1" are inserted with their rolling element cages 10" directly into corresponding recesses (not provided with specific reference signs) in the guide carriage 2', the guide carriage 2' now having legs 23' with bearing running surfaces 28 machined therein. Because it is thereby possible to dispense with the support plate 12, there is an increase in the rigidity of the linear guide system. Here, the material of the guide carriage 2' is preferably a hardenable steel, and the bearing running surfaces 28 are finish-machined after heat treatment in order to be able to obtain sufficient running accuracy and wear resistance. Here too, the recirculating element guides 1" are again embodied as units that can be preassembled.

Figure 5:
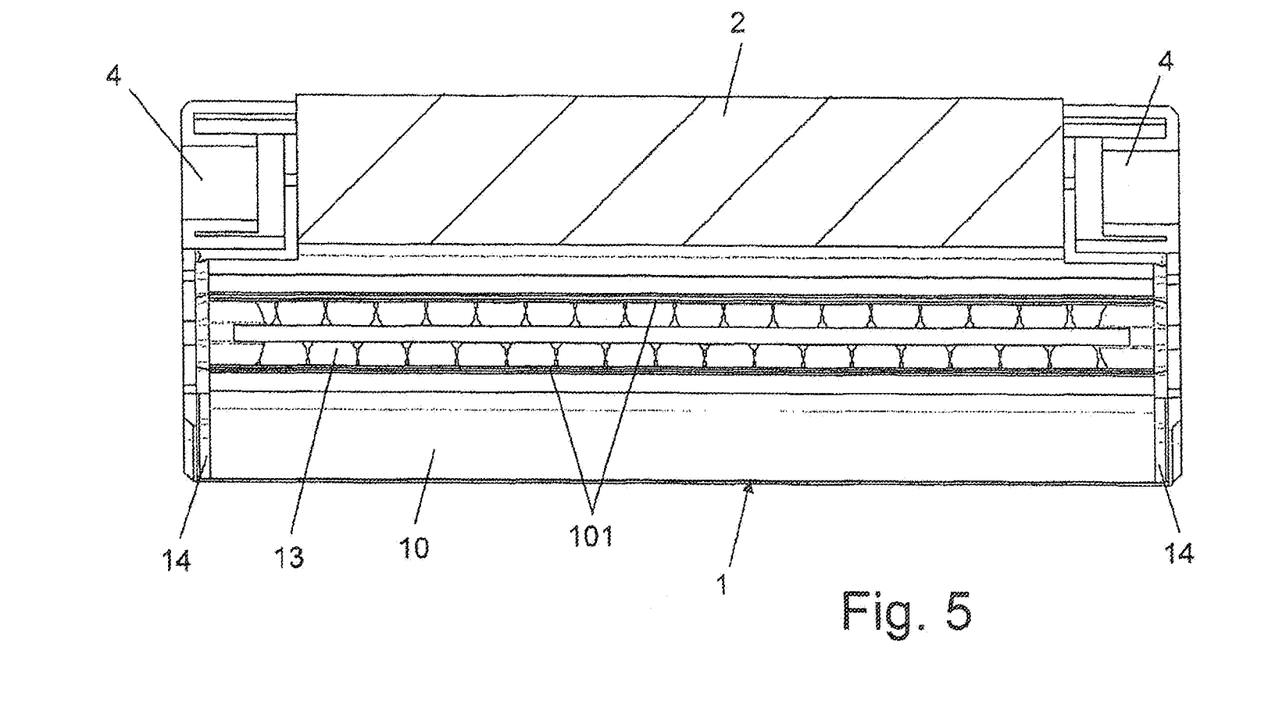
FIG. 5 shows a representation of a linear guide unit in accordance with section V-V in FIG. 3 but without a rail-type part.

FIG. 5 shows a view of the linear guide unit in accordance with section V-V in FIG. 3 but the guide rail 3 has been omitted. Here, the recirculating element guide 1 installed in the guide carriage 2, with part 10 of the rolling element cage, the sealing lips 101 and the rolling elements 13, can be seen. Also visible or indicated by dashes are the covers 14 inserted into the ends of the rolling element cage, the purpose of which covers is to cover and to redirect the rolling elements 13 at the ends. An end plate 4, which serves to cover and secure the recirculating element guide 1 in the guide carriage 2, can furthermore be seen at both ends of the guide carriage 2.

Figure 6:
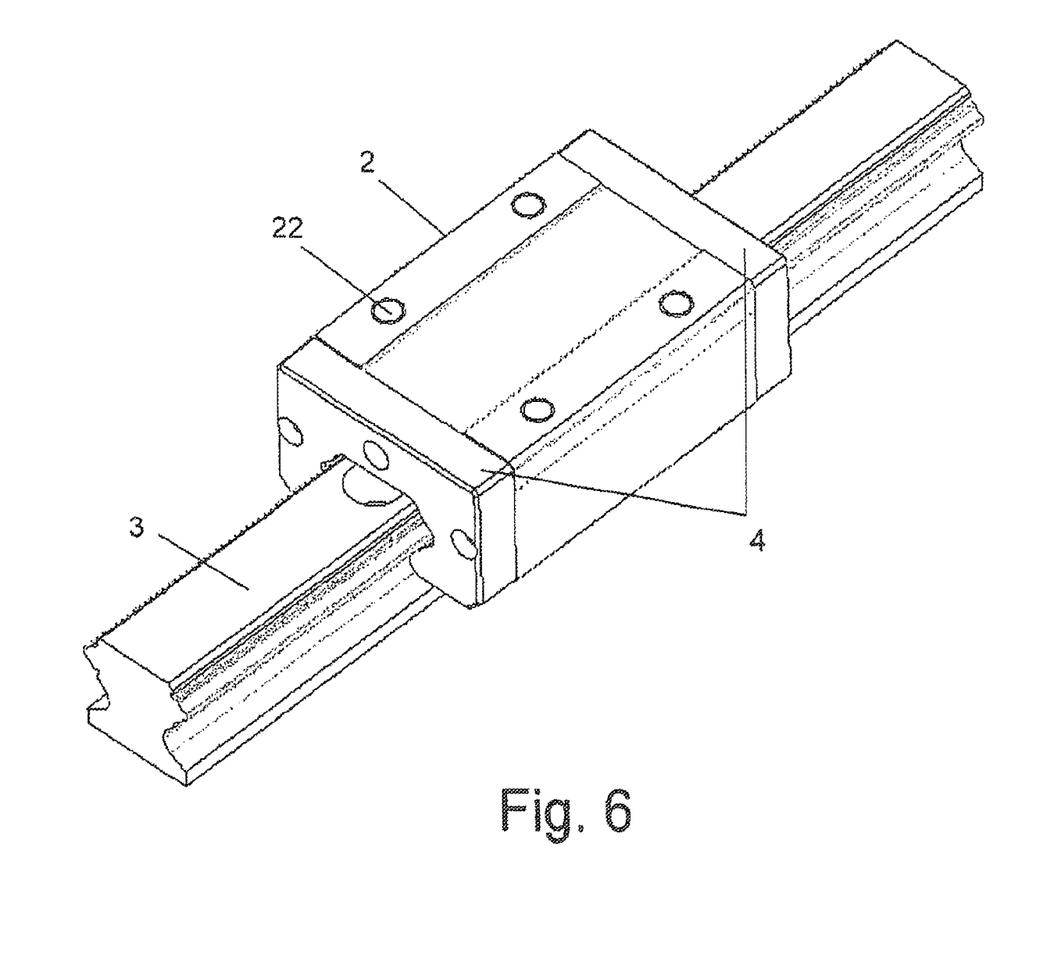
FIG. 6 shows a perspective representation of the linear guide unit in accordance with FIG. 5 with a rail-type part, although the recirculating element guides are not visible.

FIG. 6 shows a perspective representation of the linear guide unit in accordance with FIG. 3, although only the guide carriage 2 with the end plates 4 and the guide rail 3 is shown. The abovementioned blind holes 22 are furthermore readily apparent.

Figure 7:
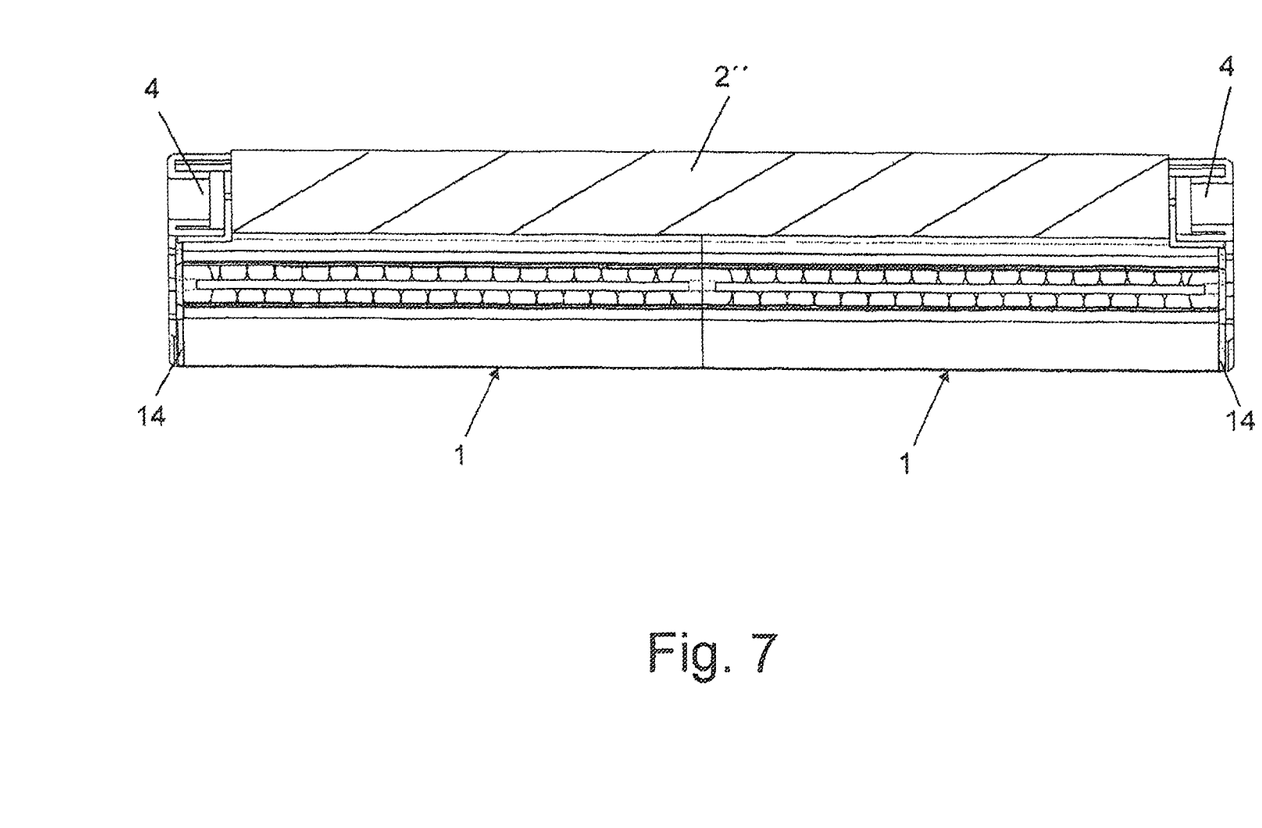
FIG. 7 shows a representation of an extended linear guide unit comparable to that in FIG. 5, with two recirculating element guides according to the invention having been mounted in series.

FIG. 7 shows a representation of a further, alternative linear guide unit with an axially extended guide carriage 2", in which, in contrast to the linear guide unit in FIG. 5, two recirculating element guides 1 are mounted axially in series, making it possible to increase the length of the linear guide unit. It is of course also possible to mount more than two recirculating element guides 1.

Figure 8:
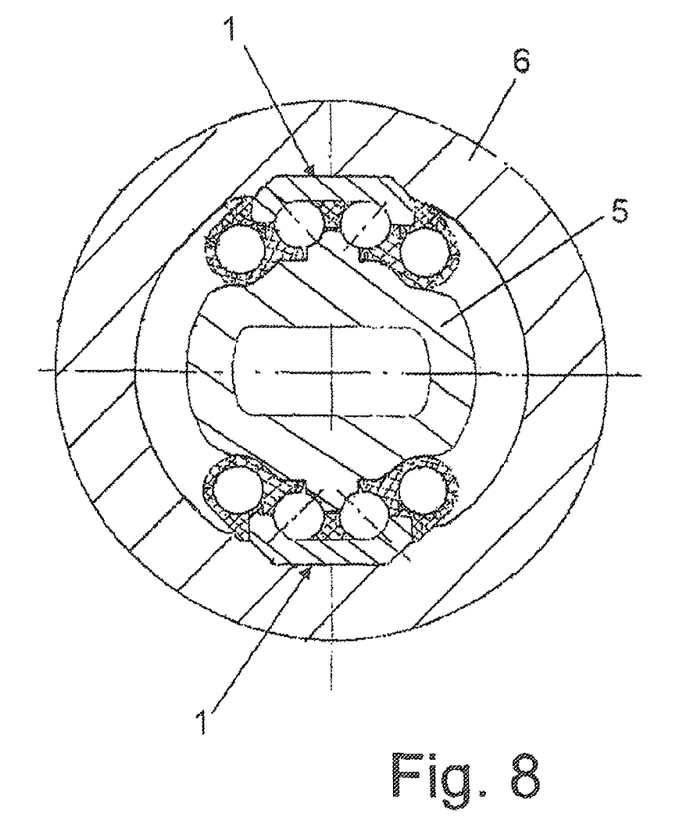
FIG. 8 shows a cross-sectional representation of an alternative linear guide unit, which is embodied as a torque-transmitting ball bushing.

FIG. 8 now shows a further, alternative embodiment of a linear guide unit, namely a torque-transmitting ball bushing with a profiled shaft 5 serving as a guide rail and with a ball bushing 6 serving as a guide carriage. Two recirculating element guides 1 according to the invention are mounted in an X arrangement between the profiled shaft 5 and the ball bushing 6.

Figure 9:
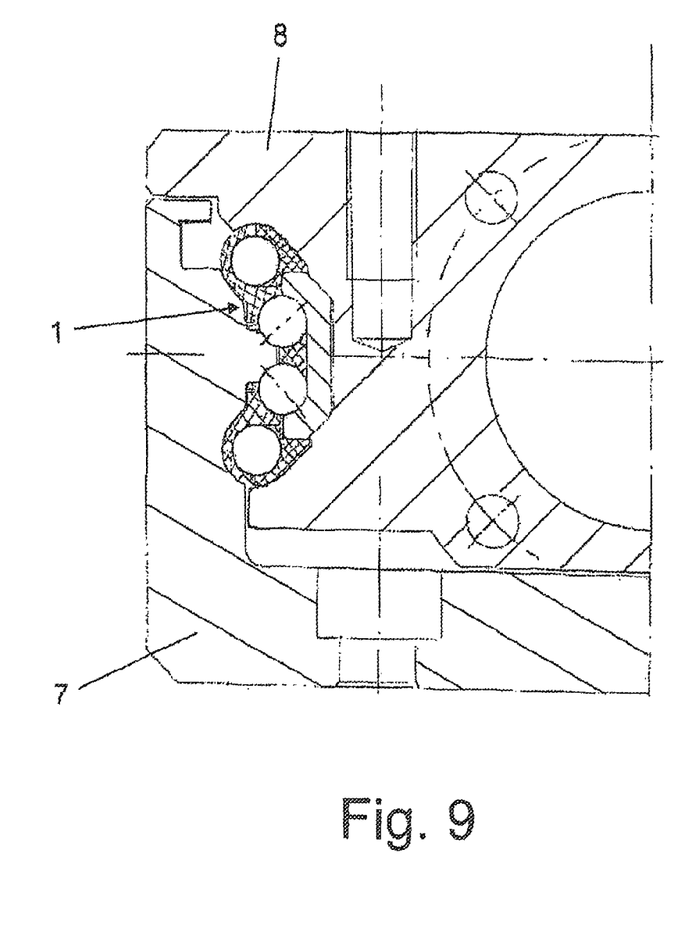
FIG. 9 shows a cross-sectional representation of a further, alternative linear guide unit in the form of a driven linear axis.

FIG. 9 shows a further embodiment of a linear guide unit in accordance with the invention in the form of a drivable linear axis 8, which is guided by means of recirculating element guides 1 designed in accordance with the invention (only one side of the cross section of the linear guide unit is shown) on a guide rail 7 in the form of a U-profile-shape.

Figure 10:
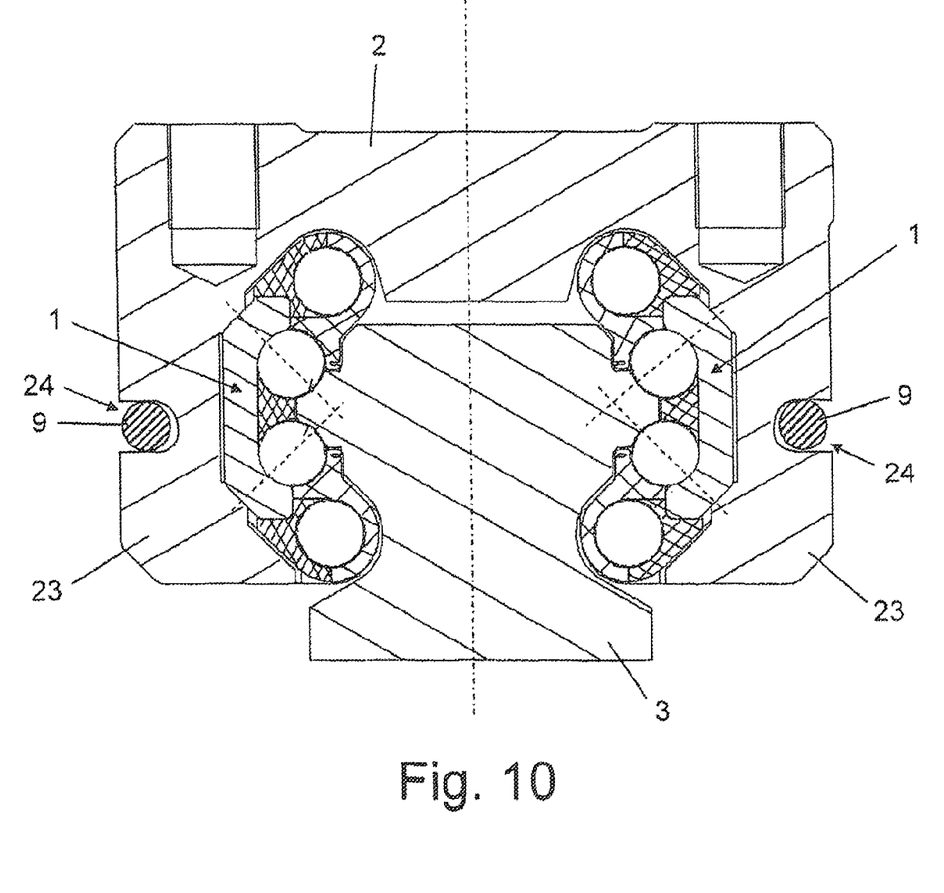
FIG. 10 shows a representation of a modified linear guide unit in accordance with FIG. 3, where additional means for setting the preload are provided.
Figure 11:
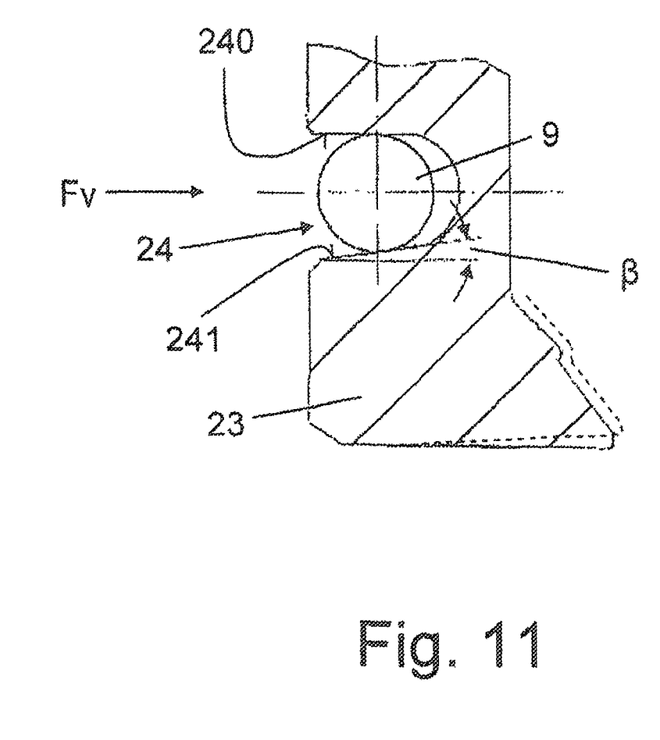
FIG. 11 shows a detail of the setting means in accordance with FIG. 10.

FIG. 10 shows a representation which is comparable with FIG. 3, in which shafts 9 are pressed into longitudinal grooves 24 in the legs 23 of the guide carriage 2 to obtain a preload. FIG. 11 shows, in a detail, the application and effect of a preloading force Fv. It is apparent that the groove 24 has an upper, approximately horizontally oriented wall 240 and a lower wall 241 sloping at an angle of incidence p. As soon as the shaft 9 is pressed into the groove 24 with a preloading force Fv (see arrow), this groove 24 is expanded and the lower part of the leg 23 is angled slightly inward, with the result that it assumes the position indicated by dashes, and the rolling elements 13 of the loaded rolling element rows Rb are held under preload.

Figure 12:
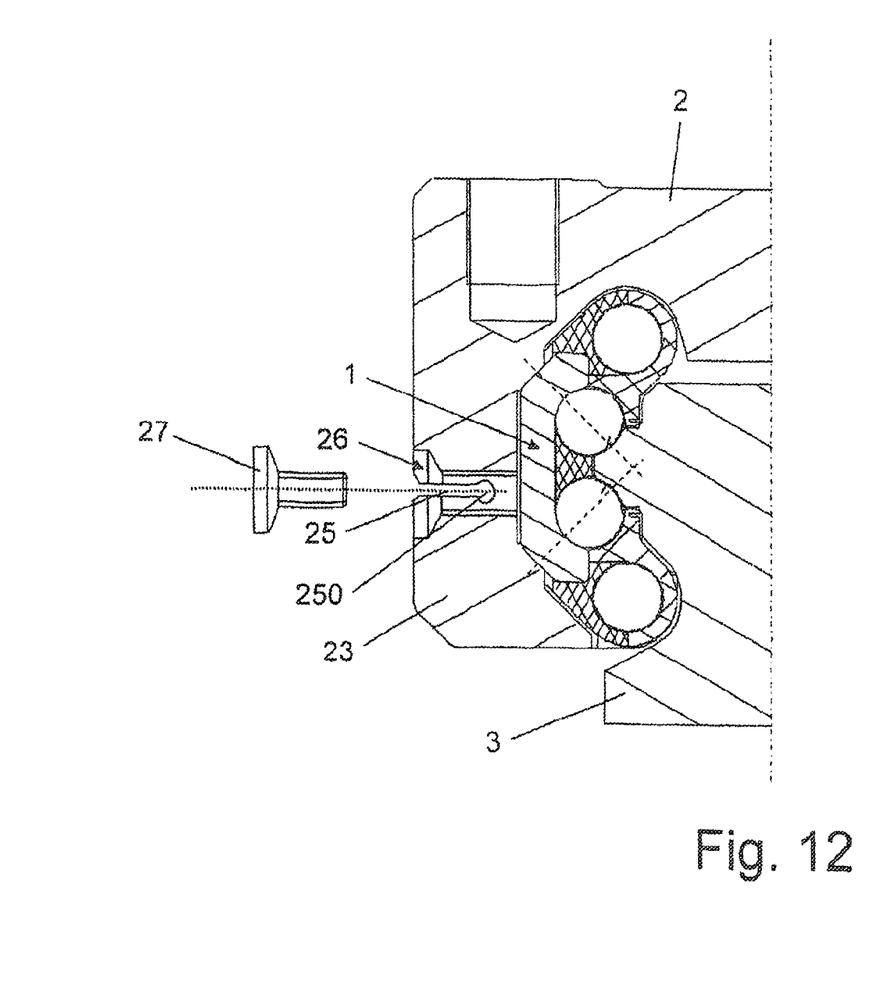
FIG. 12 shows a representation similar to FIG. 10, in which only one side of the guide unit is shown owing to symmetry, with modified means for setting the preload.

Finally, an alternative possibility thereto, for producing a preload by means of countersunk screws 27, is shown in FIG. 12. In this case, the legs 23 of the guide carriage 2 are each provided with a continuous longitudinal slot 25, which merges into a longitudinal hole 250 radially on the inside. A plurality of countersunk holes 26 distributed at uniform intervals is preferably arranged along the longitudinal slots 25. When the countersunk screws 27 are now screwed into the countersunk holes 26, the longitudinal slot 25 is expanded, and the lower part of the leg 23 undergoes a similar deflection to that already described in connection with the illustrative embodiment shown in FIG. 10.

LIST OF REFERENCE SIGNS 1, 1', 1" Tecirculating element guide
10, 10', 10" Part of rolling element cage
100 Guide groove
101 Sealing lip
11 Part of rolling element cage
110 Guide groove
111 Central part of part 11
12 Support plate
120 Contact surfaces of the support plate
121 Bearing running surfaces of the support plate
122 Mounting surfaces of the support plate
13 Spherical rolling elements
14 Cover of rolling element cage
2, 2', 2" Guide carriage, carriage-type part
20 Recesses for the rolling element cage
21 Contact surfaces of the guide carriage
22 Blind hole
23, 23' Legs of the guide carriage
24 Grooves in the legs of the guide carriage
240 Upper wall of the groove
241 Lower wall of the groove
25 Longitudinal slot
250 Longitudinal hole
26 Countersunk hole
27 Countersunk screw
28 Bearing running surface of the guide carriage
3 Guide rail, rail-type part
30 Recesses in the guide rail
31 Bearing running surfaces of the guide rail
32 Sealing surfaces of the guide rail
4 End plate
5 Profiled shaft
6 Ball bushing
7 Guide rail in the form of a U-profile shape
8 Linear axis
9 Shafts
$\alpha$ Angle between the planes of the rolling element rows
$\beta$ Angle of incidence
$\gamma 1, 2$ Angle between the planes Eb and Eu
Eb Plane formed by the centers of the loaded rolling element rows
Eu1, 2 Plane formed by the centers of the loaded rolling element rows and the respectively associated unloaded rolling element rows
F1 Compressive force acting on the guide carriage
F2 Tensile force acting on the guide carriage
Fv Preloading force
KF1 Lines of force in the case of compressive force
KF2 Lines of force in the case of tensile force
M Center line
Rb Loaded rolling element rows
Ru Unloaded rolling element rows

The invention claimed is:
1. A recirculating element guide for rolling elements for use in a linear guide unit having a carriage part; and a rail part, the recirculating element guide comprising:
two loaded rolling element rows and two unloaded rolling element rows,
a bearing cage for the rolling elements which at least partially guides both the two loaded rolling element rows and the two unloaded rolling element rows, the bearing cage comprising a plurality of bearing cage components including a first bearing cage component and a second bearing cage component, the second bearing cage component comprising a central part in the area of a center line of the bearing cage, the first bearing cage component and the central part forming a guide channel therebetween for loaded rolling elements of the two loaded rolling element rows, an elongate plate component secured on the bearing cage, the elongate plate component having two rolling element raceways corresponding to the two loaded rolling element rows, and two discrete contact surfaces disposed opposite the two rolling element raceways, and configured to contact respective contact surfaces on the carriage part of the linear guide unit to absorb the compressive forces acting between the elongate plate and the carriage part, wherein the first bearing cage component has two first guide grooves and the second bearing cage component has two second guide grooves, the first guide grooves and the second guide grooves complement each other to form two tubular guide channels therebetween respectively holding the two unloaded rolling element rows, and two confrontingly opposed sealing lips arranged on the first bearing cage component for contact with the rail part and disposed in a volume defined between the two tubular guide channels.

2. The recirculating element guide as claimed in claim 1, wherein first plane is formed by a center of each of the two loaded rolling element rows, and a center of each of the two unloaded rolling element rows corresponds to the center of the respectively associated loaded rolling element row thereby forming a further plane between each associated unloaded rolling element row and loaded rolling element row, the first plane and each respective further plane defining a respective particular angle.

3. The recirculating element guide as claimed in claim 2, wherein the angles formed in each case between the first plane and the further plane are approximately equal.

4. The recirculating element guide as claimed in claim 2, wherein the angles are less than 90°.

5. The recirculating element guide as claimed in claim 4, wherein the angles are between 5° and 45°.

6. The recirculating element guide as claimed in claim 1, further comprising at least one cover-type component redirecting the rolling elements into the at least one loaded rolling element row and the at least one unloaded rolling element row.

7. The recirculating element guide as claimed in claim 1, wherein the elongate plate component has a curved or angled form in cross-section.

8. The recirculating element guide as claimed in claim 1, wherein the two contact surfaces of the elongate plate component are disposed approximately at right angles to one another.

9. The recirculating element guide as claimed in claim 1, wherein the rolling elements are spherical.

10. A linear guide unit with a carriage part and a rail part, wherein the linear guide unit contains at least one recirculating element guide as claimed in claim 1, wherein the carriage part has a plurality of approximately perpendicularly projecting legs which fit at least part way around the rail part, the recirculating element guide being arranged between the carriage part and the rail part, and the groove-shaped recesses being machined into the legs and having a tapering aperture cross-section such that, when the rail part is pressed into the groove-shaped recesses, one part of the legs in each case undergoes a deflection which increases a preload.

11. The linear guide unit as claimed in claim 10, wherein the linear guide unit has two said recirculating element guides.

12. The linear guide unit as claimed in claim 10, wherein the at least one recirculating element guide is arranged in such a way that an X-arrangement of lines of pressure of the loaded rolling element rows is obtained.

13. The linear guide unit as claimed in claim 10, wherein both the rail part and the carriage part have recesses, into which the bearing cage for the rolling elements at least partially projects.

14. The recirculating element guide as claimed in claim 1, wherein the two loaded rolling element rows and the two unloaded rolling element rows are arranged symmetrically about the center line of the bearing cage.

* * * * *